United States Patent
Pai et al.

(10) Patent No.: US 10,521,828 B2
(45) Date of Patent: Dec. 31, 2019

(54) METHODS FOR DETERMINING TARGETING PARAMETERS AND BIDS FOR ONLINE AD DISTRIBUTION

(71) Applicant: ADOBE INC., San Jose, CA (US)

(72) Inventors: Deepak Pai, Santa Clara, CA (US); Trung Nguyen, San Jose, CA (US); Sy Bor Wang, Menlo Park, CA (US); Jose Mathew, San Jose, CA (US); Abhishek Pani, San Francisco, CA (US); Neha Gupta, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 876 days.

(21) Appl. No.: 15/176,760

(22) Filed: Jun. 8, 2016

(65) Prior Publication Data
US 2017/0358007 A1    Dec. 14, 2017

(51) Int. Cl.
*G06Q 30/02* (2012.01)

(52) U.S. Cl.
CPC ..... *G06Q 30/0275* (2013.01); *G06Q 30/0277* (2013.01)

(58) Field of Classification Search
CPC .......... G06Q 30/0275; G06Q 30/0277
USPC ....................................... 705/14.71
See application file for complete search history.

(56) References Cited

U.S. PATENT DOCUMENTS

| | | | |
|---|---|---|---|
| 2008/0270363 A1* | 10/2008 | Hunt | G06F 16/2462 |
| 2011/0295723 A1* | 12/2011 | Priyadarshan | G06Q 10/087 |
| | | | 705/28 |
| 2012/0246609 A1* | 9/2012 | Boden | G06F 8/10 |
| | | | 717/101 |

FOREIGN PATENT DOCUMENTS

WO    WO-2008040024 A2 *    4/2008    ............ G06Q 10/10

OTHER PUBLICATIONS

Yabing Liu, Measurement and Analysis of OSN Ad Auctions, 2014 (Year: 2014).*

* cited by examiner

*Primary Examiner* — Tarek Elchanti
(74) *Attorney, Agent, or Firm* — Brake Hughes Bellermann LLP

(57) ABSTRACT

Systems and methods are disclosed herein for distributing online ads with electronic content according to online ad request targeting parameters. One embodiment of this technique involves placing online test ads across multiple online ad request dimensions and tracking a performance metric for the online test ads. The performance of the online ad request dimensions is estimated based on the tracking of the performance metric for the online test ads and online ad request targeting parameters are established for spending a budget of a campaign to place online ads in response to online ad requests having particular online ad request dimensions. Online ads are then distributed based on using the online ad request targeting parameters to select online ad requests.

18 Claims, 6 Drawing Sheets

METHODS FOR DETERMINING TARGETING PARAMETERS AND BIDS FOR ONLINE AD DISTRIBUTION

TECHNICAL FIELD

This disclosure relates generally to computer-implemented methods and systems and more particularly relates to improving the efficiency and effectiveness of computing systems used to manage and distribute online ads.

BACKGROUND

Elaborate computing systems are used to coordinate the display of online ads to visitors of web pages, search engine users, social media users, e-mail recipients, and other electronic device users. In a common example, a merchant (marketer) wanting to reach its customers (visitors) on some other company's website (publisher), like a sport television network's website, does so by bidding on one or more online ad-slots on the publisher's web pages. The publisher web pages have online ad-slots that are commonly auctioned via an online ad-exchange such as the DoubleClick Ad Exchange™ program by Google, Inc. of Mountain View, Calif. Demand Side Platforms (DSPs) such as Adobe® Media Optimizer, by Adobe Systems, Inc. of San Jose, Calif., place bids on behalf of marketers. For example, when a visitor requests a web page, an online ad-exchange quickly runs an auction to a find a bidder. The online ad-exchange provides an online ad requests that bidders bid upon and the winning bidder's online ad is displayed with the web page as an online ad-impression. The visitor could then potentially take a desired action, such as clicking on the online ad, making a purchase on the marketer web site, etc.

Every day there are billions of online ad requests requesting bids for available online ad-slots. Marketers and the automated systems that assist marketers continue to struggle to distinguish and select appropriate online ad requests. For example, showing an online ad about promotional offers in California to a person residing in India would be meaningless. On the other hand, it would make sense to display an online ad about tires on automobile related web pages. Existing provide no way to identify which dimensions (i.e., attributes of the web page and/or visitor) of the online ad requests to use to select online ads bid requests to bid on. Moreover, once a bid request is identified to bid on, an appropriate bid amount must be selected and existing systems.

Existing techniques for selecting online ad requests to respond to and appropriate bidding amounts have deficiencies. For example, contextual techniques serve online ads based on best contextual matching, serving an online ad for a credit card on web pages related to financial articles. However, the contextual associations between the online ads and the web pages are manually identified and based on intuition and assumptions. As a result, online ads are often not optimally placed. In addition, contextual models are generally based on textual analysis of the web pages and hence require extensive crawling of the web pages followed by natural language processing. These processing requirements make contextual techniques impractical in many circumstances. For example, a response to an online ad bid request generally must be made in 200 ms or less, making it infeasible to do contextual analysis of web pages in real-time. Additionally, natural language processing tools come with their own shortfalls making the contextual bids sub-optimal. In certain scenarios based on domain knowledge, human curated lists of websites or website categories have been created where online ads are displayed. However, such an approach only includes certain well-known web-domains while excluding the vast inventory available in the online ad-exchanges. Moreover, the right categories are often not obvious to simple human observation.

Behavior-based ad placement techniques are similarly inefficient. For example, behavior models are created for single or cohorts of visitors based on user attributes (e.g., age, gender, income, etc.) and online ads are served based on visitors having an expected interest that is similar to the online ad's topic. Data for single visitors is, however, often unavailable, changing over time, or so sparse that it is insufficient to statistically deduce useful visitor information.

SUMMARY

Systems and methods are disclosed herein for distributing online ads with electronic content according to online ad request targeting parameters. One embodiment of the invention involves placing online test ads across multiple online ad request dimensions and tracking a performance metric for the online test ads. The performance of the online ad request dimensions is estimated based on the tracking of the performance metric for the online test ads. Online ad request targeting parameters are established for spending a budget of a campaign to place online ads in response to online ad requests having particular online ad request dimensions. Online ads are then distributed based on using the online ad request targeting parameters to select online ad requests.

Systems and methods are also disclosed for distributing online ads with electronic content using optimized bidding. One embodiment of the invention involves identifying online ad request targets based on targeting parameters and determining bid landscapes for individual online ad request targets that identify expected performance for different incurred bid costs. An optimization is executed to determine bid values for the online ad request targets to spend a campaign budget to maximize the performance metric. Online ads are then distributed based on the identified online ad request targets and determined bid values for the online ad request targets.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
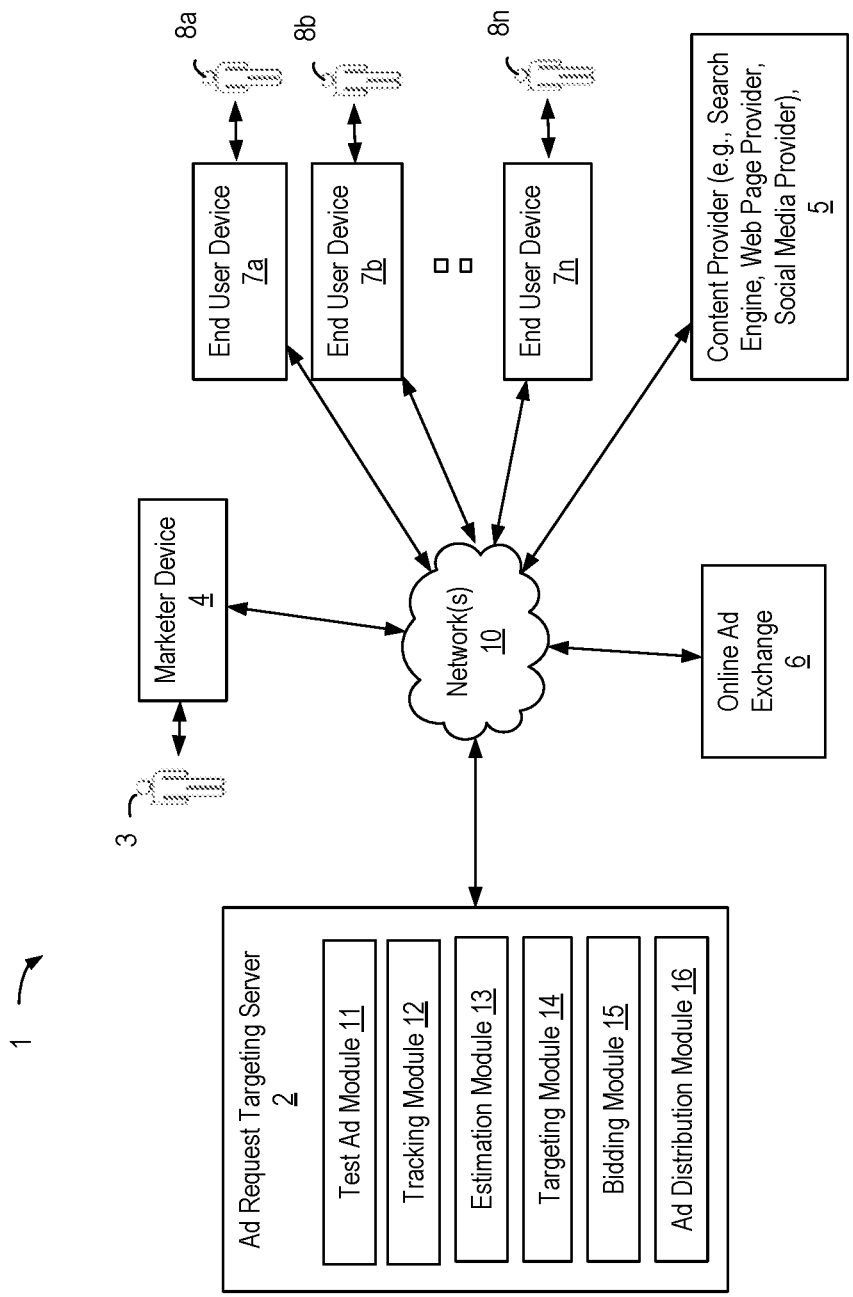
FIG. 1 illustrates an exemplary computer network environment in which an exemplary system automatically determines targeting parameters and bids for distributing online ads.

As discussed above, existing techniques do not adequately match online ad bid requests with online ads or identify appropriate bidding amounts to best achieve marketing campaign objectives. New techniques of the present invention provide a supervised approach to improve online ad bid request targeting. One exemplary technique uses a data-gathering phase, in which online ads are placed across variety of online ad request dimensions. For example, an online ad is provided on a sports web page to a visitor in California, a news web page to a visitor in Texas, a sports web page to a visitor in Texas, etc. A desired metric, such as revenue per thousand impressions (RPM), is then tracked to learn what combinations of dimensions performs better than others. Once sufficient information about the performance of individual dimensions is obtained, the system automatically determines to target online ad bid requests based on the performance of the individual dimensions. In the above example, the system determines to target "news" web pages visited in California and sports web pages visited in Texas, and thus implicitly determines to not target news web pages visited in Texas and sports web pages visited in California. The new techniques are well-suited to handle many dimensions (e.g., URL, web page category, visitor location, visitor age, etc.) with many possible values (50 possible states, hundreds of possible countries, etc.) The new techniques are able to place online ads generally based on online ad bid request dimensions that perform well and use the assessment of dimension performance to provide efficient and useful bid amount determinations. The new techniques overcome disadvantages of the existing techniques by effectively learning from historic data. Additionally, the learning enables the techniques to adapt to a dynamically changing marketplace.

As used herein, the phrase "online ad" refers to an item that promotes an idea, product, or service that is provided electronically in or with a web page, social media, keyword search result, e-mail, or other electronic communication sent, accessed by, or made available to one or more individuals through a computer network such as the Internet. Examples of online ads include, but are not limited to, images, text, graphics, sound, and/or video incorporated into a web page, search engine result, or social media content on a social media app or web page that advertise or otherwise promote or sell something, usually a business's product or service.

As used herein, the phrases "online ad request" refers to an online ad slot or other opportunity for placement of an online ad in or with a web page, social media, keyword search result, e-mail, or other electronic communication sent, accessed by, or made available to one or more individuals through a computer network such as the Internet.

As used herein, the phrase "online test ad" refers to an online ad that is provided and its performance tracked for the purpose of developing or adjusting an online ad distribution of similar online ads or ads for the same marketing campaign.

As used herein, the phrase "online ad request dimensions" and "bid unit" refers to attributes of an online ad request. Online ad request dimensions include information about the website or other online ad opportunity (e.g., URL, category, webpage, keywords, ad position on a web page, etc.), information about the visitor (e.g., country, state, geographic region, language, device type, gender, age, etc.), and attributes of the particular online ad or ads (e.g., which campaign the online ad belongs to, what is the display size of the online ad, etc.)

As used herein, the phrase "attribute" refers to any characteristic, quality, trait, or feature. Attributes of an online ad requests include, but are not limited to, characteristics of the web page on which an online ad will appear such as title, URL, topic, author, domain, country of origin, etc., and characteristics of a keyword search include attributes of the search and the webpage associated with the search including, but not limited to, the URL, the search keywords, the search results, etc. Attributes of the viewer include, but are not limited to, the viewer's age, gender, income, consumer segment, profile information, location, purchase history, etc., Attributes of an online ad include, but are not limited to, its topic, is size, its dimensions, its length (for time-based ads), it source, its date of origin, etc.

As used herein, the phrase "electronic content" refers to any content in an electronic communication such as a web page or e-mail accessed by, or made available to, one or more individuals through a computer network such as the Internet. Examples of electronic content include, but are not limited to, images, text, graphics, sound, and/or video incorporated into a web page, search engine result, or social media content on a social media app or web page.

As used herein, the phrase "performance" refers to an assessment of how well an online ad does with respect to achieving a marketing objective.

As used herein, the phrase "performance metric" refers to any measure of online ad performance. Examples include, but are not limited to, click-through rate, view-through rate, conversion rate, revenue per thousand impressions ("RPM") where revenue refers to any metric of interest that is trackable, e.g., measured in dollars, clicks, number of accounts opened and so on.

As used herein, the phrases "campaign" and "marketing campaign" refer to a marketing effort comprising one or more online ads with a marketing objective such as increasing brand awareness for a particular brand. A campaign is associated with a "budget" that is to be spent over the duration of the campaign. A "budget" can be broken down into smaller increments, e.g., a daily budget, weekly budget, monthly budget, etc., for a given campaign. A "portfolio" includes one or more "campaigns."

As used herein the phrase "target" refers to a group of homogenous online ad requests characterized one or more online ad request dimensions. The requests within a given target are homogenous in their RPM values in one example.

As used herein, the phrases "targeting parameters" and "targeting variables" refer to values for online ad request dimensions selected for identifying online ad requests as targets. For example, online ad requests having an online ad request dimension of web page category having a value of "automotive" are targeted by specifying this targeting parameter. Similarly, an online ad request dimension that identifies a webpage visitor location dimension as having the value "California" can similarly be targeted by specifying this targeting parameter.

As used herein, the phrase "bid" refers to an offer to pay an amount for a search, webpage, or social media online ad opportunity in response to an online ad request. Bids are used to place online ads in display advertising, search advertising, and social media advertising. The phrase "keyword bid" refers herein to an offer to pay to have an online ad provided by a search engine in search results that are provided in response to a search engine search in search advertising. Search advertising is sold and delivered on the basis of keywords. An individual uses a search engine to enter keywords to make queries. A "keyword" is one or more words. Several search engines conduct running auctions to sell online ads according to bids received for keywords and relevance to online ads. In display advertising, an online ad (e.g., an image, text, audio, and/or video) is provided along with web page content in response to requests from one or more individuals for the web page. For example, a banner ad location on a web page that is populated to display an online ad is an example of a web page location. Another example is an opportunity to provide a pop-up ad along with requested web page content. Another example is an opportunity to play audio along with requested web page content. In social media advertising, an online ad (e.g., an image, text, audio, and/or video) is provided along with social media content. An example is a location in a news feed for an online ad. Another example is a location within a series of shared content items from a given user or account, e.g., a location with a series of tweets.

FIG. 1 illustrates an exemplary computer network environment 1 in which an exemplary system automatically determines targeting parameters and bids for distributing online ads. The exemplary computer network environment 1 includes a marketer device 4, an ad request targeting server 2, an exemplary content provider 5, an online ad exchange 6, and end user devices 7a-n. End user device 7a-n are used by visitors 8a-n to access electronic content via network 10 from content providers such as content provider 5. A marketer 3 implements a marketing campaign to distribute online ads along with the content that is obtained by the visitors 8a-n and viewed (or experienced) on end user devices 7a-n. For example, marketer 3 uses marketer device 4 to create several online ads and specifies a marketing campaign that is ultimately used to determine how a marketing campaign budget will be used to pay for placement of the online ads with the electronic content obtained by the visitors 8a-n.

Ad request targeting server 2 helps marketer 3 implement a marketing strategy by automatically placing online ads in response on online ad requests, for example, by bidding on online ad requests offered by online ad exchange 6 regarding placement of ads in electronic content provided by content provider 5.

The ad request targeting server 2 includes a test ad module 11, a tracking module 12, an estimation module 13, a targeting module 14, a bidding module 15, and an ad distribution module 16. The test ad module 11 distributes online ads to test a variety of online ad request dimensions. For example, the test ad module 11 bids on online ad requests offered by online ad exchange 6 for a variety of combinations of geographic locations, categories, visitor attributes, etc. The tracking module 12 keeps track of the performance of the online test ads that are distributed by the test ad module. For example, tracking module 12 tracks clicks through rates on the online ads as a performance metric.

The estimation module 13 of the ad request targeting server 2 estimates the performance of individual online ad request dimensions based on the tracking of the performance metrics for the online test ads. For example, the estimation module may identify that online ad requests having an online ad request dimension that indicates the webpage is associated with an "automotive" category perform well, e.g., online ads placed by bidding on those requests lead to a desirable percentage of conversions, etc.

The targeting module 14 uses the estimations of performance of online ad request dimensions to identify particular dimensions, i.e., targeting parameters, to be used to target future online ad placements. These determinations are based on an information about the marketing campaign. Specifically, online ad request targeting parameters are established for spending a budget of a campaign to place online ads in response to online ad requests having particular online ad request dimensions. For example, the targeting module 14 determines to target online ad requests having online ad request dimensions requiring a web page category of "automotive" and visitor location "California" and to also target online ad requests having online ad request dimensions requiring a web page category of "vehicles" and visitor location "Nevada." In other example, varying combinations of online ad request dimensions are used to target online ad requests.

The bidding module 15 bids on the online ad requests to control the distribution of online ads by the ad distribution module 16. The bidding module also determines appropriate bid amounts based on information about the campaign and other bidding criteria. In one embodiment of the invention, the bidding module 15 determines a bid landscape for individual online ad request targets. The bid landscapes identify an expected performance metric for different incurred bid costs. The bid landscapes are used to perform an optimization that determines bid values for the online ad request targets to spend a campaign budget to maximize the performance metric. In this way, the bidding module 15 helps the marketer best achieve marketing objectives in the fast paced computing environment of online ad placement bidding.

Figure 2:
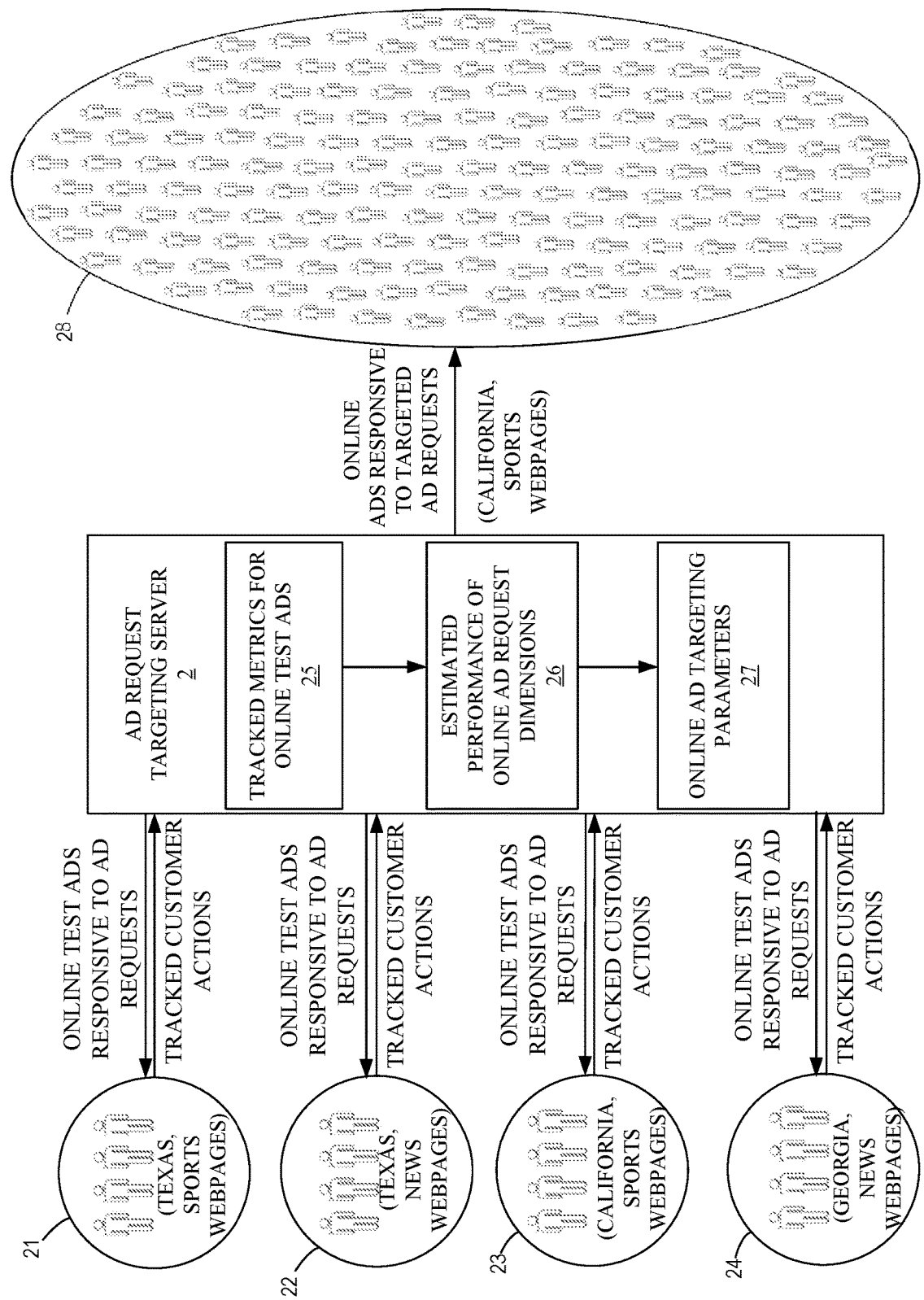
FIG. 2 illustrates an example of using online test ads to estimate performance of online ad request dimensions and establish online ad request parameters to distributed online ads.

FIG. 2 illustrates an example of using online test ads to estimate performance of online ad request dimensions and establish online ad request parameters to distributed online ads. In this example ad targeting server 2 sends online test ads responsive to online ad requests having a variety of online ad request dimensions. In this example, online test ads are shown to be distributed to visitors in four groups for illustrative purposes. Additional online test ads (not shown) are also sent to test additional online ad request dimension combinations. In many practical implementations, the number of dimensions and permutations of dimensions will be significantly larger. The online test ads need not be sent to all possible permutations of dimension combinations, but is generally desirable to send online test ads to test enough combinations that statistically meaningful conclusions can be drawn with respect to dimension performance.

In the example of FIG. 2, online test ads are distributed in response to online ad requests 21 that have a visitor location dimension of "Texas" and a webpage category dimension of "Sports." Another group of online test ads are distributed in response to online ad requests 22 that have a visitor location dimension of "Texas" and a webpage category dimension of "News." A third group of online test ads are distributed in response to online ad requests 23 that have a visitor location dimension of "California" and a webpage category dimension of "Sports." A fourth group of online test ads are distributed in response to online ad requests 24 that have a visitor location dimension of "Georgia" and a webpage category dimension of "News."

Customer actions responsive to the test online ads distributed with the online ad requests 21-24 are tracked by ad targeting server 2. In other implementations, tracking functionality is performed via a separate device, system, and/or entity. The tracked customer actions in response to the online test ads are used to create tracked metrics for the online test ads. 25. These tracked metrics for the online test ads 25 are used to determined estimated performance of online ad request dimensions 26. In a specific example, the technique determines that 7% of the online ads distributed in response to online ad requests with the category "Sports" converted but only 2% of the online ads distributed in response to online ad requests with the category "News" converted. Similarly, the technique determines that 8% of the online ads distributed in response to online ad requests for visitors in California converted, 4% of the online ads distributed in response to online ad requests for visitors in Texas converted, and only 1% of the online ads distributed in response to online ad requests for visitors in Georgia converted.

The estimated performance of online ad request dimensions 26 are then used to determine online-ad request targeting parameters 27. In this example, the technique determines to target online ad requests for webpages with the category "Sports" and for visitors in "California." Online ads responsive to targeted online ad requests are then distributed in using the targeting parameters to deliver online ads to visitors 28. In this way, the technique is able to test online ad request dimensions to best target online ad requests and thus best achieve campaign objectives.

Figure 3:
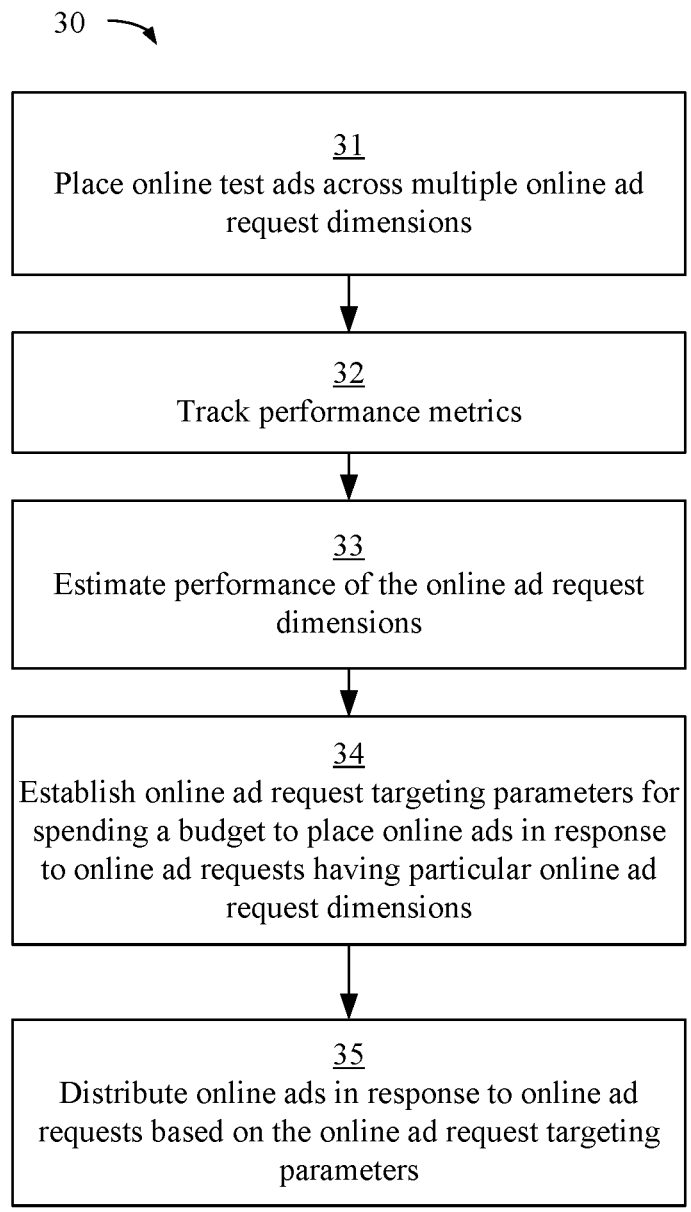
FIG. 3 is a flow chart illustrating an exemplary method for distributing online ads with electronic content according to online ad request targeting parameters.

FIG. 3 is a flow chart illustrating an exemplary method 30 for distributing online ads with electronic content according to online ad request targeting parameters. Exemplary method 30 is performed by one or more processors of one or more computing devices such as ad targeting server 2 of FIG. 1.

Method 30 involves placing online test ads across multiple online ad request dimensions, as shown in block 31. The online ad request dimensions represent multiple attributes of online ad requests. In one embodiment of the invention, a computer application receives online ad requests, identifies attributes of the requests (e.g., attributes of the web page, keyword search social media electronic content, attributes of the viewer, and/or attributes of the online ad that will be placed with the request), and automatically places bids on online ad requests that have a variety of dimensions. In this embodiment, the online ad request dimensions for the online test ads are identified automatically, for example, based on a current or previous campaign. In another embodiment, the online ad request dimensions are identified based on user input. For example, a marketer identifies dimensions that are potentially significant, e.g., identifying viewer location, viewer device type being mobile, and web page language as potentially significant.

The method 30 further involves tracking a performance metric for the online test ads, as shown in block 32. In one example an analytics server tracks visitor interactions with online test ads that are distributed, determining visitor clicks, purchases, inquires, etc. The tracking of performance metrics is used to determine online ad request dimensions to further test in one embodiment. For example, favorable results regarding online ad requests associated with a particular country can be followed up with additional online test ads to test online test ads associated with visitors in particular states or sub-regions of the country.

Based on the tracked performance of the online test ads, the method 30 further involves estimating performance of the online ad request dimensions, as shown in block 33. In one embodiment of the invention this involves determining how likely a visitor is to convert after receiving an online ad provided based on an online ad request having a particular dimension. As a specific example, the technique identifies what percentage of visitors convert after receiving online ads provided in response to online ad requests for providing online ads in web pages including video type content, what percentage of visitors convert after receive online ads provided in response to online ad requests for providing online ads in web pages with a particular publishing entity, etc.

The estimated performance of the online ad request dimensions is used by method 30 to establish online ad request targeting parameters, as shown in block 34. In one embodiment of the invention, the targeting parameters are established to spend a budget of a campaign to place online ads in response to online ad requests having particular online ad request dimensions. For example, the targeting parameters identify that the system will automatically bid on any online ad request for providing online ads with web pages including video content, associated with the topic "automotive," and to be provided to visitors using mobile devices to access the content. In one embodiment, the targeting parameters identify one or more particular combinations of online ad request dimensions that the system will automatically bid on to place online ads and spend a campaign budget.

The method 30 further involves distributing online ads based on using the online ad request targeting parameters to select online ad requests. Online ads are distributed from separate content servers in one embodiment of the invention. In one embodiment of the invention, particular online ads are associated with particular targeting parameters within a marketing campaign. For example, the targeting parameters identify that a particular online ad will be sent in response to online ad requests associated with visitors from the United States and that a different online ad will be sent in response to online ad requests associated with visitors from Canada.

The method 30, in one embodiment, is repeated periodically, for example on daily, weekly, or monthly basis, to allocate campaign budgets for the respective time periods.

Method 30 provides an example of a targeting framework of an embodiment of the invention. A targeting framework involves a learning phase that uses a variety of features to facilitate performance and allow implementation in a variety of different circumstances. In one embodiment of the invention, there is an initial learning or data-gathering phase lasting a few days. During the period, the system spends a small percentage of the total budget to place online test ads on an available inventory. Some of these online test ads result in desired visitor actions such as conversions.

Online test ad result information is used to learn targets. The system uses data from the online ad tests to learn targeting parameters that perform well. The system uses an appropriate technique to learn from the data. In one embodiment of the invention, the system uses a machine learning-based analysis. In one embodiment of the invention, targeting parameters are established by building a regression tree with online ad request dimensions as independent variables and the performance metric as the dependent variable and identifying targets based on paths from a root of the regression tree to leaf nodes of the regression tree. In this example, a first online ad request dimension that best distinguishes performance according to a performance metric is identified and used to create a first layer of nodes in a regression tree for values for the first online ad request dimension. For each of the first layer nodes, a respective second online ad request dimension is identified based on the performance metric and sub-nodes are created to the first layer nodes for values of the respective online ad request dimension. Additional layers are created in a similar manner for each sub-node and so on until a complete regression tree is created. Targets are then identified as targeted combinations of online ad request dimensions based on paths from a root of the regression tree to leaf nodes of the regression tree. The number of targets identified is based on a campaign budget and historical spend and performance data in one implementation.

In a specific exemplary implementation, the system builds a regression tree that groups targets with similar RPM or other metric values. For example, the online ad request dimension for visitor state will have values associated with particular RPM amounts (e.g., California $10 per 1000 impressions, Texas $15 per 1000 impressions, New York $12 per 1000 impressions, Delaware $2 per 1000 impressions, Maryland $1 per 1000 impressions, etc.). The online ad request dimension values with similar amounts are grouped together. In the above example, California, Tex., and New York dimensions are grouped together and Delaware and Maryland impressions are grouped together. The size and number of groupings depends on the implementation. Grouping values together in this way enhances the efficiency of the optimization especially when many dimensions and many dimension values (e.g., 50 states, etc.) are considered. By grouping values, fewer combinations of dimension values are considered in the computations. Thus grouping reduces the computations and is not arbitrary since it is based on similarity and grouping can be chosen to select values that are similar with statistical confidence.

An illustrative example of using a regression tree uses a regression tree involving two dimensions in which a web page category dimension includes news and sports values and visitor state dimension includes California and Texas values. The technique recognizes that if it makes a distinction based on category, the RPM difference will only be 1 based on determining that the sports category is associated with an RPM of 3 and the news category is associated with an RPM of 4. The technique further recognizes that if it if it makes a distinction based on visitor state, the RPM difference will be 10 based on determining that California is associated with an RPM of 10 and Texas is associated with an RPM of 20. The technique thus determines that, of the two dimensions, the visitor state dimension best distinguishes the data. In an embodiment in which dimension values are grouped (e.g., with Florida grouped with Texas based on having similar RPM), the split would be based on state groups rather than individual states.

After splitting the data based on finding the best dimension, the technique further subdivides the groups in a similar manner. For each of the groups (e.g., visitor state Texas and visitor state California), the technique finds the best dimension and splits the group in to sub groups. Once the regression tree is completed, it represents targets based on pathways through the tree (e.g., with pathways representing varying combinations of dimension values). An automated process traverses the regression tree to identify the best targets, i.e., the best combination of dimensions as targeting parameters. As the automated process traverses the tree from the root to leaf, it considers each decision points and form a target accordingly.

Depending upon the circumstances, the technique can identify multiple paths and thus multiple targets. This is appropriate, for example, the best target does not provide enough online ad opportunities. For example, it may be necessary to select multiple targets and/or to rank targets in order to ensure that it is likely that an entire campaign budget will be spent. Thus traversing the regression tree to identify targets accounts for campaign budget in one embodiment. For example, after going down a best path, if more budget remains, the technique will proceed to another path, and so on, until enough targets have been selected for spending a campaign budget. Doing so involves estimating the number and/or costs of pursuing particular targets, e.g., how many online ad requests in California for webpages of category sports will occur and be won on a given day and how much placing online ads on those requests will cost.

In the exemplary regression tree target selection process involving RPM as the measure of performance, only high RPM values are considered in forming the regression tree. This is because low RPMs are non-performing dimensions that do not need to be included. Thresholds such as this are useful in improving the efficiency of identifying targets using a regression tree-based or other appropriate technique.

Figure 4:
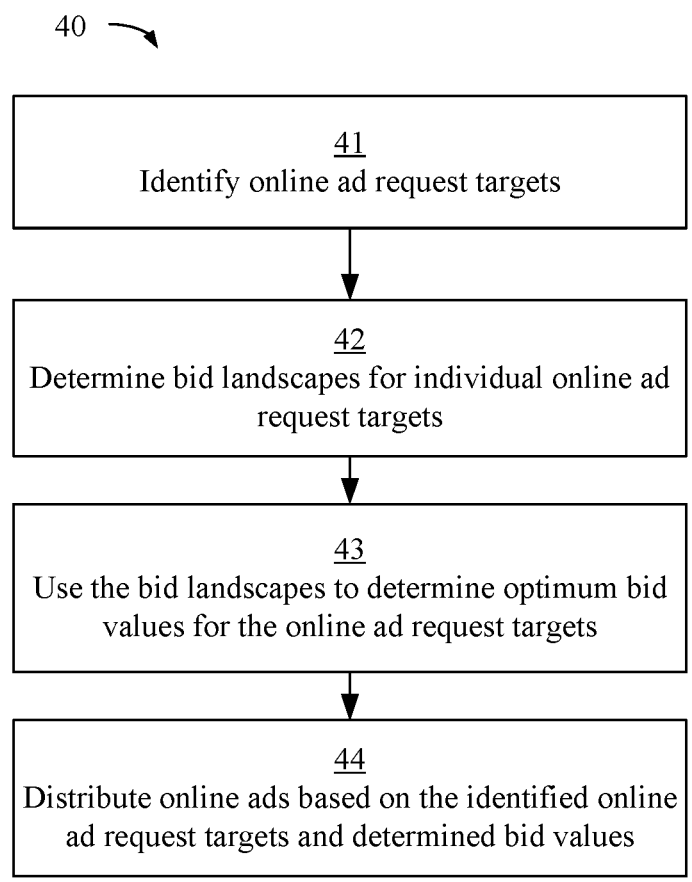
FIG. 4 is a flow chart illustrating an exemplary method for distributing online ads with electronic content using optimized bidding.

FIG. 4 is a flow chart illustrating an exemplary method 40 for distributing online ads with electronic content using optimized bidding. Exemplary method 40 is performed by one or more processors of one or more computing devices such as ad targeting server 2 of FIG. 1. Exemplary method 40 involves identifying online ad request targets, as shown in block 41. This can involve any appropriate technique for identifying an online ad target, including but not limited to, the techniques for identifying online ad requests discussed with respect to FIG. 3.

The method 40 further involves determining bid landscapes for individual online ad requests targets, as shown in block 42, and using the bid landscapes to determined optimum bid values for online ad request targets, as shown in block 43. Online ads are distributed based on the identified online ad request targets and determined bid values, as shown in block 44.

Determining bid values is based on an optimization problem model in one embodiment of the invention in which the optimization attempts to maximize the revenue obtained by bidding on various targets, subject to the constraint that the cost incurred is equal to the available budget. In mathematical terms, the problem is stated as:

$$\max(\text{Revenue}_i) \, s.t. \, \text{sum}(\text{cost}_i) = \text{Budget}$$

where

Revenue$_i$ is the estimate of revenue we get from i$^{th}$ target.

Cost$_i$ is the estimate of spend on i$^{th}$ target.

In one implementation, a landscape of bids for each target is used. For example, a bid landscape uses bid values from 10 cents to $20 and, for each bid value, predicts an expected revenue amount. The bid landscapes are used to solve an optimization problem to find the optimal bid for each target. In this way a budget for a campaign is allocated for different bid amounts for multiple target.

The optimal bid ($b_i$) for each target is identified by solving the above equation. However, solving the equation becomes computationally intensive as the number of dimensions increases and the number of potential targets increases.

In certain circumstances it is impractical to solve the equation within a needed timeframe. For example, in real time bidding (RTB) scenarios, once a request arrives, the demand side platforms (DSPs) typically have 100-200 milliseconds to respond to the ad-exchange. Due to the real-time nature of the problem, it is computationally infeasible to arrive at optimal bids for a large number of targets. In one embodiment of the invention, this issue is circumvented by dividing the targeting dimensions into two sets, e.g., primary dimensions and secondary dimensions. The primary and secondary dimensions are identified using a regression tree, such as the regression tree described above, in one example. In this example, in the regression tree algorithm, a score such as information gain or gini-index is computed for each dimension. The score determines if the dimension significantly discriminates values of the desired metric of interest. In this example, the technique selects the top K dimensions as primary dimensions by their respective discriminating ability. The remaining dimensions are considered to be the secondary dimensions. The parameter K, in this example, is determined heuristically.

Targets formed by the primary dimensions are used in the optimization process discussed above. As primary dimensions form a small subset of the universe of available dimensions for targeting, the optimization process becomes feasible. The secondary dimensions are then optionally used with simpler equations to provide approximations. For example, if visitor state is a primary dimension and category is a secondary dimension. The optimization is run only on groups based on state. Such an optimization could determine that it is optimal to spend $70 on California, $30 on Texas, and $0 in Georgia. The secondary webpage category dimension (news, sports) is then used to allocate the $70 within California to news or sports, for example, using roughly determined proportions.

In an example in which a marketer specifies $100 to spend for the next day, the system determines which requests to bid on and how much to bid. By the end of the day, the system expects to have bid on enough requests according to the developed bidding strategy to have spent the budget. The system may not actually spend the entire budget, but it expects to do so based on historical information and bidding plan that is employed is optimized to attempt to spend the budget in a way expected to maximize return on investment. Thus, targets and bids are established to create a strategy for bidding that is implemented to achieve a certain spend for a daily, weekly, or other budget. The budget and bidding strategy can be adjusted during the day if budget changes or bidding conditions differ from the initial expectations.

Various techniques can be used to adjust bids using secondary dimensions. One approach computes an optimal bid using the formula:

Optimal bid=Sqrk($C$*rpm)/(alpha*lambda)+$C^2$)−$C$

In this equation C represents a win-rate factor. Win-rate is defined as the ratio of the number of wins in an external auction (marketplace) to the number of bids made. In one example, the number of wins corresponds to the number of online ad impressions that are served. Win-rate is thus modeled using the function:

Win-rate=Bid/(Bid+$C$)

C is estimated using historic data to find a best-fit curve for the above equation.

RPM in the optimal bid equation represents revenue per thousand impressions. Revenue data in many display advertising contexts is sparse. In many cases, there is no revenue data at the desired granularity and, in cases in which there is revenue data, there is often significant variance. This means that spikes in revenue are likely noise in the data. The scarcity of revenue data and the resulting noise spikes are addressed by smoothing the revenue data. To achieve this, a hierarchical method of estimating revenue is used in one embodiment of the invention. Revenue at the top-most level of the hierarchy, i.e., at the portfolio level, is estimated first. Next, in the hierarchy, revenue is estimated at the campaign level. A campaign-level estimate is smoothed using the higher portfolio-level estimate. Similarly, lower level estimates (e.g., online ad request level estimates) are smoothed with the estimates from the campaign level.

Alpha in the optimal bid equation is defined as the ration of cost to bid:

Alpha=cost/bid

0<Alpha<=1

Alpha is used in the optimal bid equation because the equation accounts for a second price auction configuration. In a second price auction, the winner of the auction pays the price equivalent to the bid from the second highest bidder. The equation accounts for the fact that in the second price auction scenario, the cost incurred on serving an impression is always less than or equal to the bid value. Alpha is estimated using historical data to find the best fit curve for the equation.

Lambda is used in the optimal bid equation to intuitively represent the marginal increase in revenue for every additional cost increment (e.g., dollar) spent. Lambda is obtained as one of the parameters while solving the optimal bid equation, for example, using the Lagrangian method.

Figure 5:
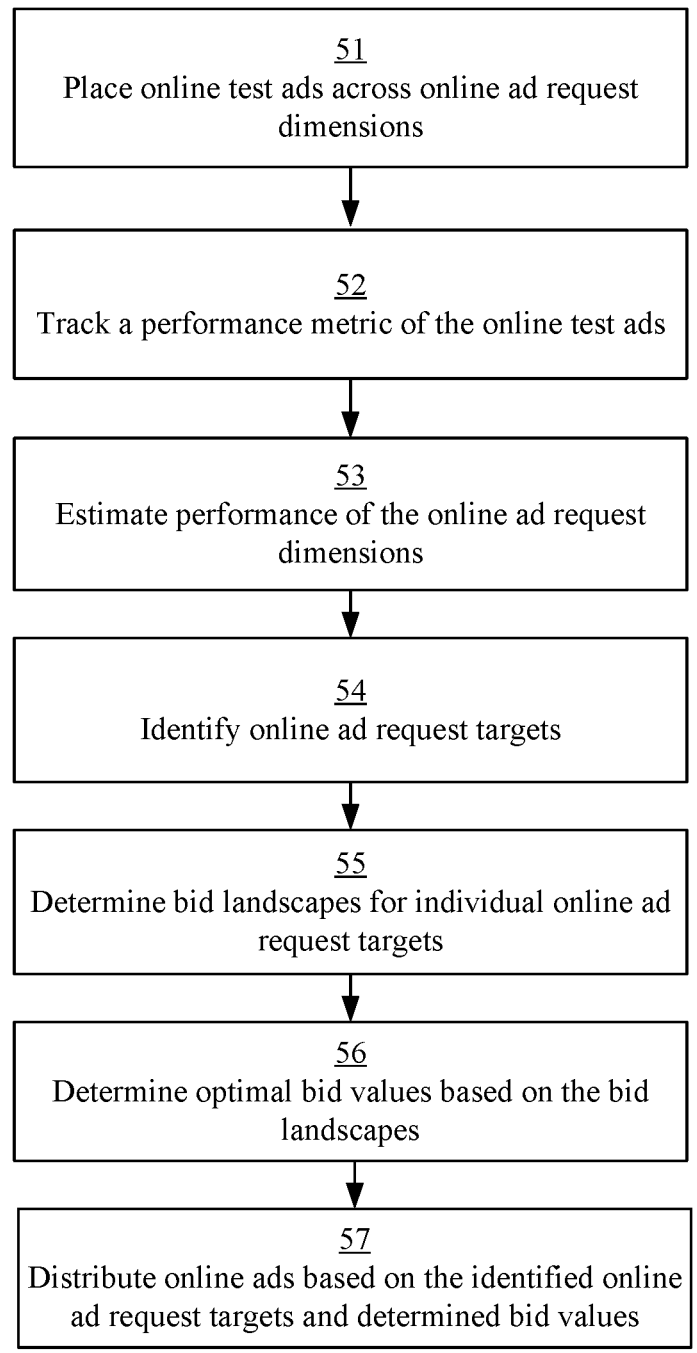
FIG. 5 is a flow chart illustrating an exemplary method for distributing online ads with electronic content according to online ad request targeting parameters and optimized bidding.

FIG. 5 is a flow chart illustrating an exemplary method 50 for distributing online ads with electronic content according to online ad request targeting parameters and optimized bidding. Exemplary method 50 is performed by one or more processors of one or more computing devices such as ad targeting server 2 of FIG. 1. In method 50, online test ads are placed across online ad request dimensions, as shown in block 51, and a performance metric of the online test ads is tracked, as shown in block 52. Based on this information performance of online ad request dimensions are estimated, as shown in block 53, and online ad request targets are identified, as shown in block 54. For example, online ad request targets comprise combinations of high performing online ad request dimensions in one embodiment of the invention.

Method 50 further involves determining bid landscapes for individual online ad request targets, as shown in block 55, and, based on the bid landscapes, determines optimal bid values, as shown in block 56. For example, the method 50 determines that during the following day, the computing system will automatically bid $0.50 on all online ad requests that with particular targeting parameters, e.g., all requests for placing online ads on webpages associated with the category "healthcare" and for visitors with a visitor state of "Colorado."

Method 50, distributes online ads based on the identified online ad request targets and determined bid values. In one example, the method 50 automatically bids on online ad request matching the online ad request targets' targeting parameters and bids using the determined bid values. When these bids are successful, the technique automatically distributes the online ads for the won online ad requests, i.e., to be provided on the associated webpages, with the associated keyword search results, and/or with the associated social media posts.

Exemplary Computing Environment

Figure 6:
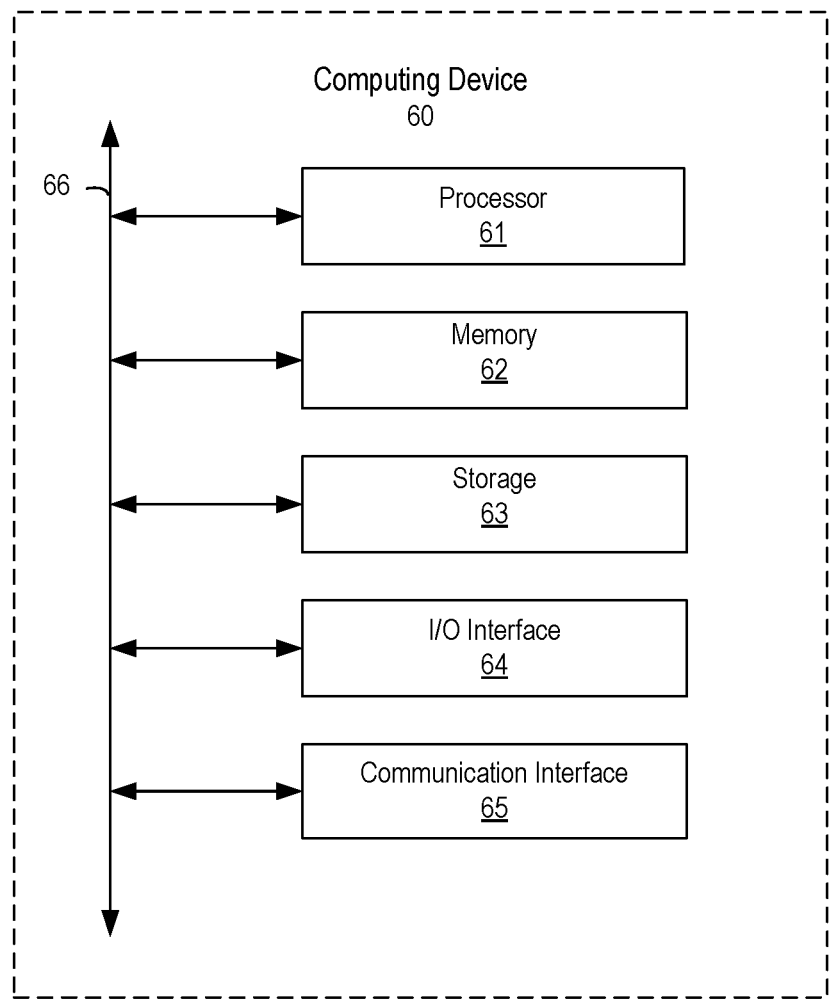
FIG. 6 is a block diagram depicting an example hardware implementation.

Any suitable computing system or group of computing systems can be used to implement the techniques and methods disclosed herein. For example, FIG. 6 is a block diagram depicting examples of implementations of such components. The computing device 60 can include a processor 61 that is communicatively coupled to a memory 62 and that executes computer-executable program code and/or accesses information stored in memory 62 or storage 63. The processor 61 may comprise a microprocessor, an application-specific integrated circuit ("ASIC"), a state machine, or other processing device. The processor 61 can include one processing device or more than one processing device. Such a processor can include or may be in communication with a computer-readable medium storing instructions that, when executed by the processor 61, cause the processor to perform the operations described herein.

The memory 62 and storage 63 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 60 may also comprise a number of external or internal devices such as input or output devices. For example, the computing device is shown with an input/output ("I/O") interface 64 that can receive input from input devices or provide output to output devices. A communication interface 65 may also be included in the computing device 60 and can include any device or group of devices suitable for establishing a wired or wireless data connection to one or more data networks. Non-limiting examples of the communication interface 65 include an Ethernet network adapter, a modem, and/or the like. The computing device 60 can transmit messages as electronic or optical signals via the communication interface 65. A bus 66 can also be included to communicatively couple one or more components of the computing device 60.

The computing device 60 can execute program code that configures the processor 61 to perform one or more of the operations described above. The program code can include one or more modules. The program code may be resident in the memory 62, storage 63, or any suitable computer-readable medium and may be executed by the processor 61 or any other suitable processor. In some embodiments, modules can be resident in the memory 62. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for distributing online ads with electronic content according to online ad request targeting parameters, the method comprising:
   placing online test ads across multiple online ad request dimensions, where the online ad request dimensions represent multiple attributes of online ad requests;
   tracking a performance metric for the online test ads;
   estimating, via a processor, performance of the online ad request dimensions based on the tracking of the performance metric for the online test ads;
   establishing, via the processor, online ad request targeting parameters for spending a budget of a campaign to place online ads in response to online ad requests having particular online ad request dimensions; and
   distributing online ads to ad recipients based on using the online ad request targeting parameters to select online ad requests, wherein distributing the online ad requests places online ads in response to the selected online ad requests, wherein the targeting parameters are established by:
   building a regression tree with online ad request dimensions as independent variables and the performance metric as a dependent variable, identifying a first online ad request dimension that best distinguishes performance according to the performance metric, the performance metric representing revenue per thousand impressions (RPMs), creating a first layer of nodes in the regression tree for values of the first online ad request dimension, for each of the first layer of nodes, identifying a respective second online ad request dimension based on RPMs and creating sub-nodes to the first layer of nodes for values for the respective online ad request dimension, and identifying targets comprising targeted combinations of online ad request dimensions based on paths from a root of the regression tree to leaf nodes of the regression tree, wherein the leaf nodes with low RPMs representing non-performing online ad request dimensions are not considered.

2. The method of claim 1, wherein online ad request dimension values are grouped based on similar performance.

3. The method of claim 1, wherein the number of targets is identified based on the budget and historical spend and performance data.

4. The method of claim 1 further comprising automatically determining bid values for targets based on the estimating of performance of the online ad request dimensions.

5. The method of claim 1 further comprising performing the method on a daily basis to allocate a daily budget to current day online ad request targets.

6. The method of claim 1 further comprising:
identifying online ad request targets based on the online ad request targeting parameters;
determining bid landscapes for individual online ad request targets, the bid landscapes identifying an expected performance metric for different incurred bid costs;
executing an optimization to determine bid values for the online ad request targets to spend a campaign budget to maximize the performance metric; and
distributing the online ads with the electronic content in accordance with the identified online ad request targets and determined bid values for the online ad request targets.

7. A computer program product for distributing online ads with electronic content according to online ad request targeting parameters, the computer program product being tangibly embodied on a non-transitory computer-readable storage medium and comprising instructions that, when executed by at least one computing device, are configured to cause the at least one computing device to:
place online test ads across multiple online ad request dimensions, where the online ad request dimensions represent multiple attributes of online ad requests;
track a performance metric for the online test ads;
estimate performance of the online ad request dimensions based on the tracking of the performance metric for the online test ads;
establish online ad request targeting parameters for spending a budget of a campaign to place online ads in response to online ad requests having particular online ad request dimensions; and
distribute online ads to ad recipients based on using the online ad request targeting parameters to select online ad requests, wherein distributing the online ad requests places online ads in response to the selected online ad requests, wherein the targeting parameters are established by:

building a regression tree with online ad request dimensions as independent variables and the performance metric as a dependent variable, identifying a first online ad request dimension that best distinguishes performance according to the performance metric, the performance metric representing revenue per thousand impressions (RPMs), creating a first layer of nodes in the regression tree for values of the first online ad request dimension, for each of the first layer of nodes, identifying a respective second online ad request dimension based on RPMs and creating sub-nodes to the first layer of nodes for values for the respective online ad request dimension, and identifying targets comprising targeted combinations of online ad request dimensions based on paths from a root of the regression tree to leaf nodes of the regression tree, wherein the leaf nodes with low RPMs representing non-performing online ad request dimensions are not considered.

8. The computer program product of claim 7, wherein online ad request dimension values are grouped based on similar performance.

9. The computer program product of claim 7, wherein the number of targets is identified based on the budget and historical spend and performance data.

10. The computer program product of claim 7 further comprising instructions that, when executed by the at least one computing device, are configured to cause the at least one computing device to automatically determine bid values for targets based on the estimating of performance of the online ad request dimensions.

11. The computer program product of claim 7 further comprising instructions that, when executed by the at least one computing device, are configured to cause the at least one computing device to perform the instructions on a daily basis to allocate a daily budget to current day online ad request targets.

12. The computer program product of claim 7 further comprising instructions that, when executed by the at least one computing device, are configured to cause the at least one computing device to:
identify online ad request targets based on the online ad request targeting parameters;
determine bid landscapes for individual online ad request targets, the bid landscapes identifying an expected performance metric for different incurred bid costs;
execute an optimization to determine bid values for the online ad request targets to spend a campaign budget to maximize the performance metric; and
distribute the online ads with the electronic content in accordance with the identified online ad request targets and determined bid values for the online ad request targets.

13. A system for distributing online ads with electronic content according to online ad request targeting parameters, the system comprising:
at least one memory including instructions; and
at least one processor that is operably coupled to the at least one memory and that is arranged and configured to execute the instructions that, when executed, cause the at least one processor to:
place online test ads across multiple online ad request dimensions, where the online ad request dimensions represent multiple attributes of online ad requests;
track a performance metric for the online test ads;

estimate performance of the online ad request dimensions based on the tracking of the performance metric for the online test ads;

establish online ad request targeting parameters for spending a budget of a campaign to place online ads in response to online ad requests having particular online ad request dimensions; and distribute online ads to ad recipients based on using the online ad request targeting parameters to select online ad requests, wherein distributing the online ad requests places online ads in response to the selected online ad requests, wherein the targeting parameters are established by:

building a regression tree with online ad request dimensions as independent variables and the performance metric as a dependent variable, identifying a first online ad request dimension that best distinguishes performance according to the performance metric, the performance metric representing revenue per thousand impressions (RPMs), creating a first layer of nodes in the regression tree for values of the first online ad request dimension, for each of the first layer of nodes, identifying a respective second online ad request dimension based on RPMs and creating sub-nodes to the first layer of nodes for values for the respective online ad request dimension, and identifying targets comprising targeted combinations of online ad request dimensions based on paths from a root of the regression tree to leaf nodes of the regression tree, wherein the leaf nodes with low RPMs representing non-performing online ad request dimensions are not considered.

14. The system of claim 13, wherein online ad request dimension values are grouped based on similar performance.

15. The system of claim 13, wherein the number of targets is identified based on the budget and historical spend and performance data.

16. The system of claim 13 further comprising instructions that, when executed by the at least one processor, are configured to cause the at least one processor to automatically determine bid values for targets based on the estimating of performance of the online ad request dimensions.

17. The system of claim 13 further comprising instructions that, when executed by the at least one processor, are configured to cause the at least one processor to perform the instructions on a daily basis to allocate a daily budget to current day online ad request targets.

18. The system of claim 13 further comprising instructions that, when executed by the at least one processor, are configured to cause the at least one processor to:

identify online ad request targets based on the online ad request targeting parameters;

determine bid landscapes for individual online ad request targets, the bid landscapes identifying an expected performance metric for different incurred bid costs;

execute an optimization to determine bid values for the online ad request targets to spend a campaign budget to maximize the performance metric; and distribute the online ads with the electronic content in accordance with the identified online ad request targets and determined bid values for the online ad request targets.

* * * * *